(No Model.)
M. E. BEASLEY.
STEAM GENERATOR.
No. 341,721. Patented May 11, 1886.
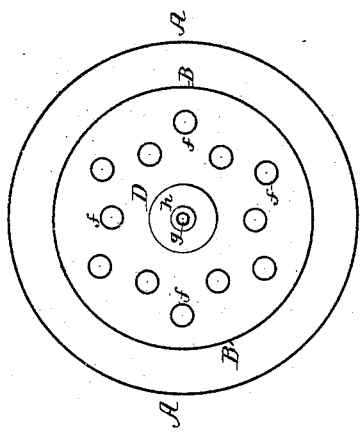
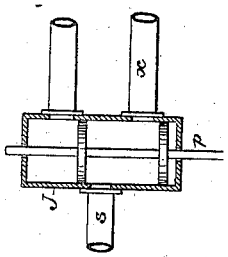
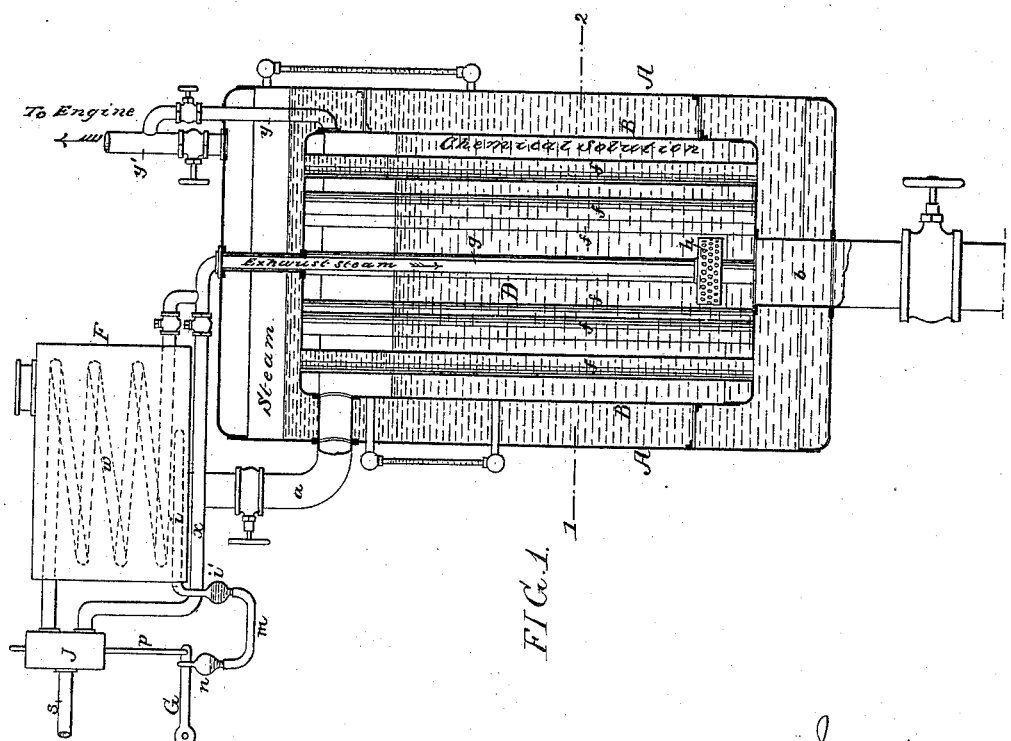
Witnesses
William F Davis
William D Conner
Inventor
Maria E Beasley
by her Attorneys
Howson & Sons

UNITED STATES PATENT OFFICE.

MARIA E. BEASLEY, OF PHILADELPHIA, PENNSYLVANIA.

STEAM-GENERATOR.

SPECIFICATION forming part of Letters Patent No. 341,721, dated May 11, 1886.

Application filed January 4, 1886. Serial No. 187,540. (No model.)

*To all whom it may concern:*

Be it known that I, MARIA E. BEASLEY, a citizen of the United States, residing in Philadelphia, Pennsylvania, have invented certain Improvements in Steam-Generators, of which the following is a specification.

My invention relates to that class of steam-generators in which the heat is derived from a chemical compound, the objects of my invention being to so construct such a generator as to insure the thorough heating of the water, to properly heat the chemical compound before introducing the same into the generator, to maintain said compound in an active state as long as possible, and to prevent the overheating of the compound before the admission of the same to the heating-chamber of the generator.

In the accompanying drawings, Figure 1 is a longitudinal sectional view of a steam-generator constructed in accordance with my invention; Fig. 2, a sectional plan view on the line 1 2, Fig. 1, and Fig. 3 an enlarged view of a valve forming part of the device.

It has been proposed to effect the generation of steam by using in the generator a vessel containing a chemical compound, which, on the addition of water or steam, will develop heat in somewhat the same manner as heat is developed on slaking caustic lime with water; and my invention consists of a generator intended for the use of such chemical fuel. The chemical which I prefer to use is a mixture of hydrate of soda, about one hundred parts to water twenty parts. The particular chemical employed, however, forms no part of my present invention, the latter being limited to the construction of the generator, which is shown in the drawings, A being the outer shell or casing suitably supported within, which is the casing B of a heating-chamber, D, which is intended to contain the liquid chemical substance or compound from which is derived the heat necessary for generating steam in the vessel A, this solution or compound being introduced into the chamber D through a pipe, *a*, and being withdrawn, when spent, through a pipe, *b*.

Through the chamber D extend tubes *f*, which serve to provide for the circulation of water through said chamber, and for the effective application of the heat of its contents to the water for the purpose of vaporizing the same.

Generators have been devised in which the fuel-chamber surrounds the water-chamber, the latter having tubes projecting down into the fuel-chamber and communicating with a hollow head; but in such case there can be no circulation except that set up through the tubes, or else a downward circulation through some of the tubes in opposition to the natural current which would be caused by the heat to which said tubes are subjected. In my generator, however, there is a perfect circulation of the water, the latter rising through the tubes which pass through the fuel-chamber and descending adjacent to the outer casing of the generator, where it is comparatively free from the influences of the heated shell of the fuel-chamber.

Into the chamber D extends a pipe, *g*, which communicates with the exhaust from the engine or other apparatus, for the operation of which the steam generated in the vessel A is intended, said pipe *g* being perforated or provided with a perforated head, *h*, so as to insure the dissemination of the steam or water of condensation in a number of small streams throughout the chamber D, and thus cause its intimate admixture with the contents of said chamber.

Before entering the chamber D the pipe *g* forms a coil, *w*, in a vessel, F, communicating with the pipe *a*, this vessel serving as a means of heating the chemical solution or compound prior to its introduction into the chamber D within the generator. By thus heating the chemical before introducing it into the chamber D, I am enabled to maintain a practically uniform pressure in the generator, as the temperature of the water is not lowered on each introduction of fresh chemical, whereas when the chemical is introduced in a cold state there is a lowering of the temperature of the water until such time as the temperature of the chemical is (owing to the absorption by said chemical of the water or steam) raised to that of the water in the generator.

In order to prevent the imparting of too high a degree of heat to the compound or solution in the preliminary heating-vessel F, however, I provide said vessel with a tube, *i*, containing alcohol or other volatile liquid, this tube having a bulb, $i'$, which is in communication through a flexible pipe, $m$, with a bulb, $n$, secured to or forming part of one arm of a lever, G, the other arm of which is weighted, said lever being connected to the stem $p$ of a valve, J, which is constructed, as shown in Fig. 3, so that when in its elevated position it will direct the steam from the supply pipe $s$ to the pipe $g$ through the coil $w$ in the vessel F; but when the valve is lowered it will cut off said coil from communication with the pipe $s$, and will direct the steam through a branch pipe, $x$, to the pipe $g$.

As soon as the heat of the chemical compound in the vessel F rises above the required degree the expansion of the fluid in the tube $i$ causes the mercury or other liquid to be forced from the bulb $i'$ into the bulb $n$, the weight thus added thereto causing the lever G to tilt, and thus effecting such an operation of the valve J as will direct the steam to the branch $x$ and cut off the coils $w$, the steam being directed to the latter again when the temperature of the compound is so far reduced as to effect a contraction of the liquid contents of the tube $i$ and a withdrawal of the mercury from the bulb $n$. Check-valves prevent back-flow through either the coil $w$ or branch $x$.

Both the generator and the heating-chamber are preferably provided with gages, as shown, whereby the level of water in the generator or of the solution or compound in the heating-chamber is indicated.

The chemical solution is heated by outside means in starting the generator, and in order that the vapor arising from said solution may be available for work in operating the motor or other apparatus before steam is generated, I provide the heating-vessel B with a valved pipe, $y$, communicating with the discharge-pipe $y'$ of the generator, the valve in said pipe $y$ being closed when steam under sufficient pressure has been generated.

I claim as my invention—

1. The combination, in a chemical-fuel steam-generator, of the generating-vessel, a fuel-holder contained therein, but accessible from the outside of the generator, and circulating-tubes passing through said fuel-holder, all substantially as specified.

2. The combination, in a chemical-fuel steam-generator, of the generating-vessel, a fuel-holder, B, contained therein, a fuel-heater communicating with said holder B, and a pipe for conveying the exhaust-steam first through the fuel-heater, and then into the holder B, all substantially as specified.

3. The combination, in a chemical-fuel steam-generator, of the generating-vessel, the fuel-holder contained therein, the fuel-heater communicating with said holder, a steam-pipe passing through the fuel-heater and having a branch outside of the same, and a valve whereby steam can be caused to pass either directly through the pipe or through the branch, all substantially as specified.

4. The combination of the generator A, the fuel-holder B, contained therein, the supplementary fuel-heater F, containing a steam-coil, a valve controlling the admission of steam to said coil, and a thermostat in the heater for operating said valve, all substantially as specified.

5. The combination of the generator A, the fuel-holder B, contained therein, the supplementary heater F, containing a steam-coil, the pipe $g$, extending into the holder B, the branch $x$, a valve whereby steam may be directed to the pipe $g$, either through the heating-coil in the vessel F or through said branch $x$, and a thermostat for operating said valve, all substantially as specified.

6. The combination of the steam-generator and its pipe $y'$ with the fuel-holder B, contained in the generator, and having a valved pipe, $y$, communicating with the pipe $y'$, as set forth.

In testimony whereof I have signed my name to this specification in the presence of two subscribing witnesses.

MARIA E. BEASLEY.

Witnesses:
WILLIAM D. CONNER,
HARRY SMITH.